Figure 1:
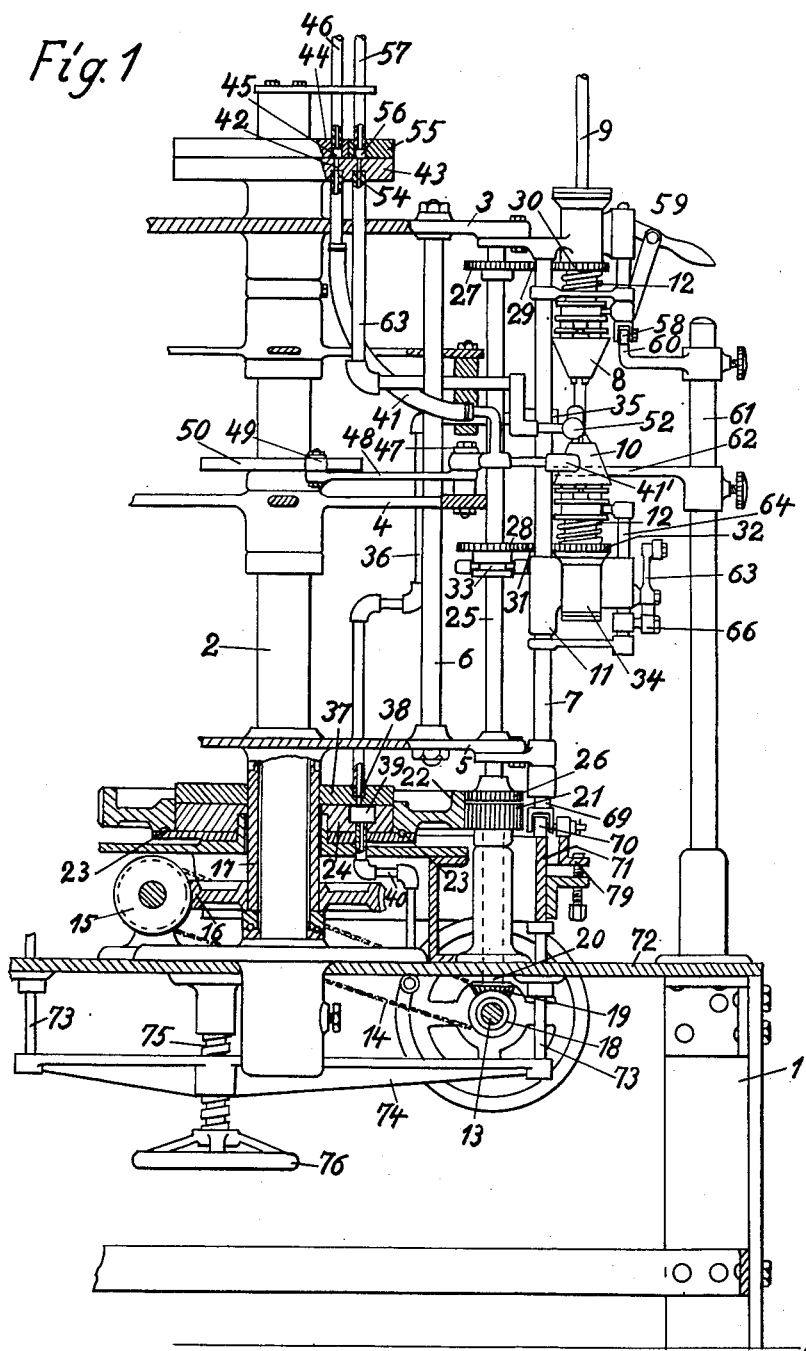

June 12, 1934. J. DICHTER 1,962,985
MACHINE FOR THE MANUFACTURE OF AMPULLAS AND THE LIKE GLASS BODIES
Filed June 22, 1931  4 Sheets-Sheet 1

INVENTOR

June 12, 1934. J. DICHTER 1,962,985
MACHINE FOR THE MANUFACTURE OF AMPULLAS AND THE LIKE GLASS BODIES
Filed June 22, 1931 4 Sheets-Sheet 2
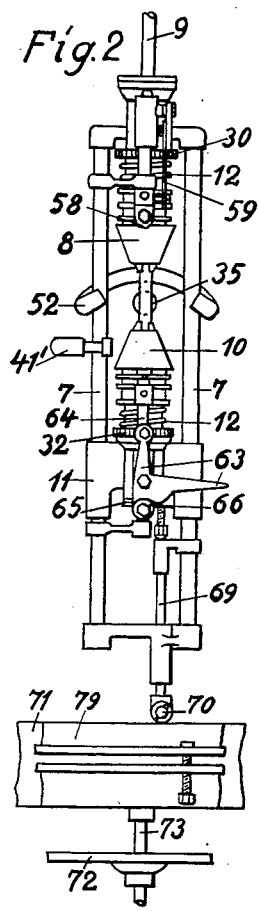
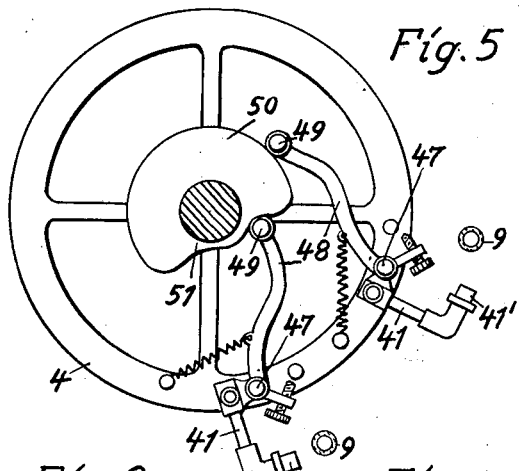
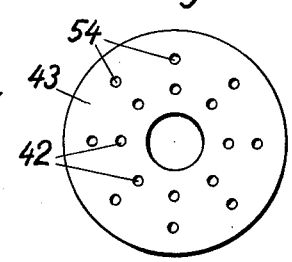
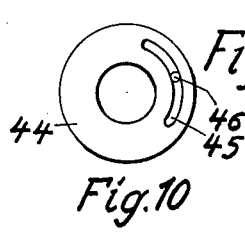
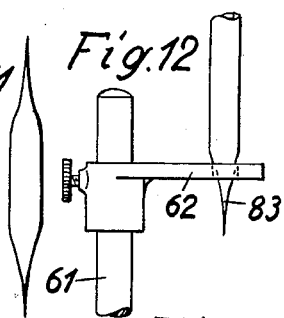
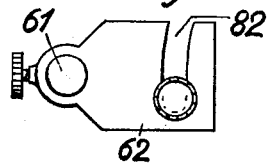
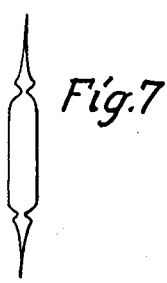
INVENTOR

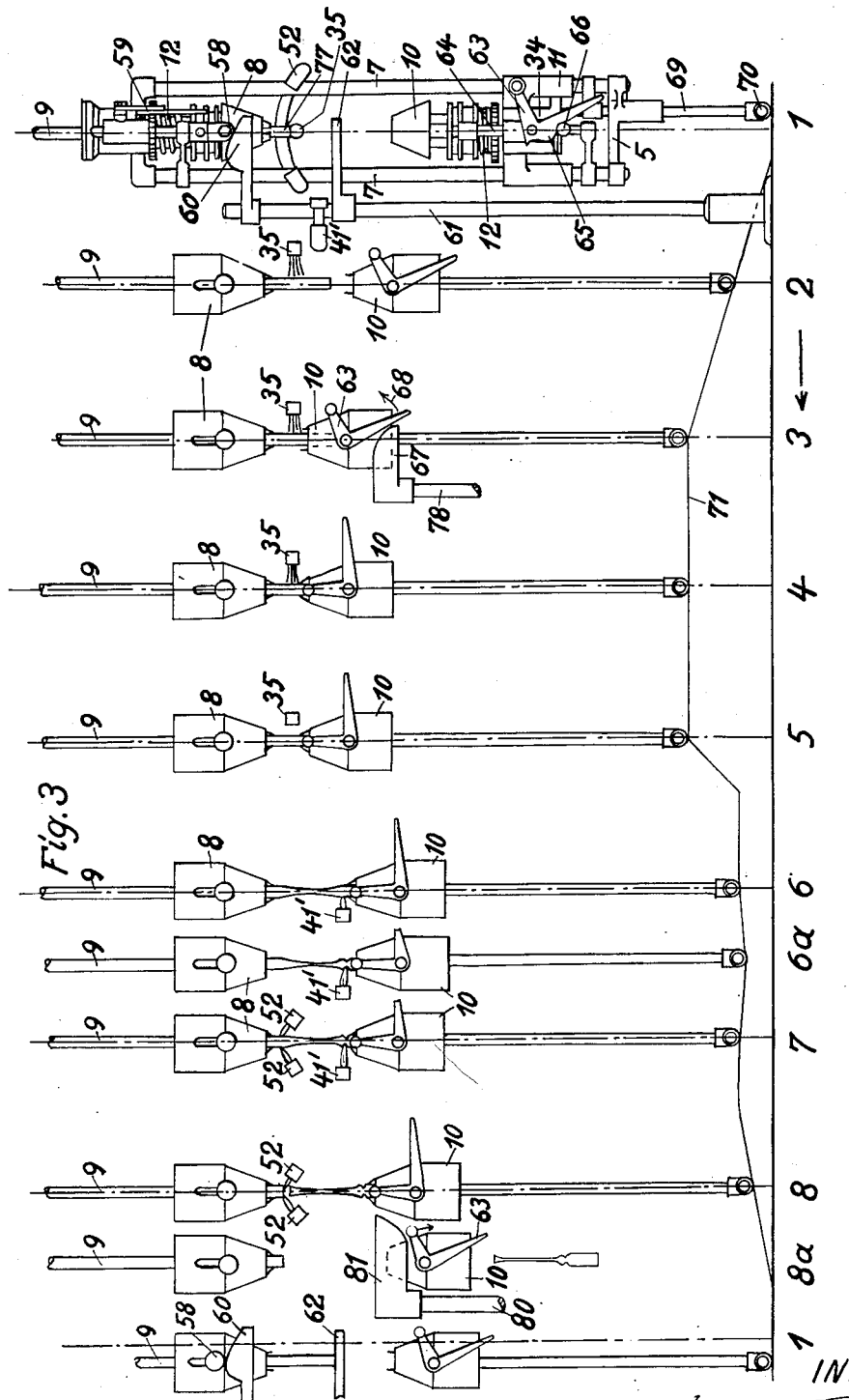

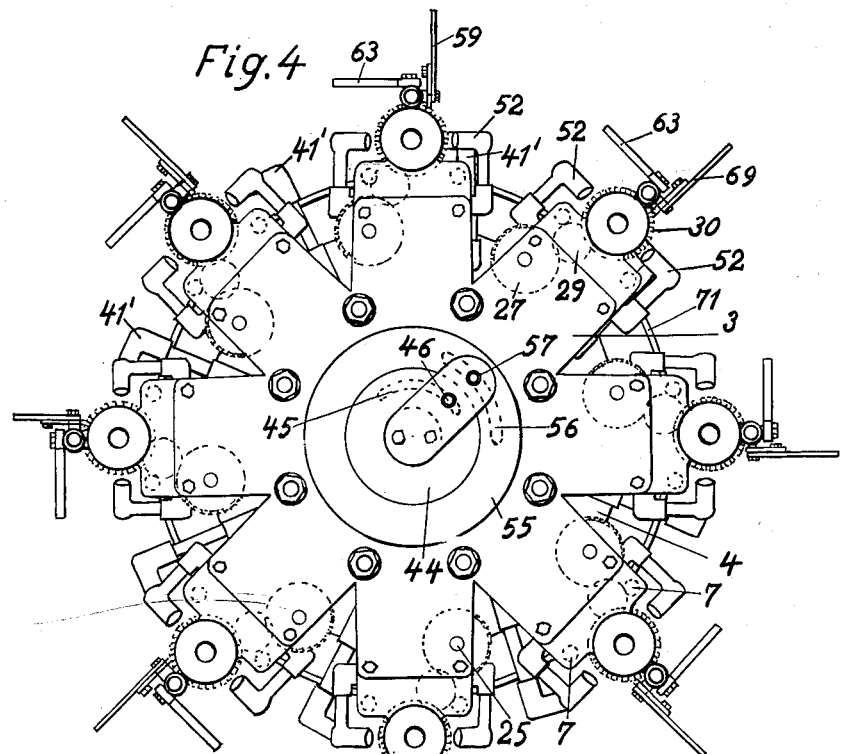
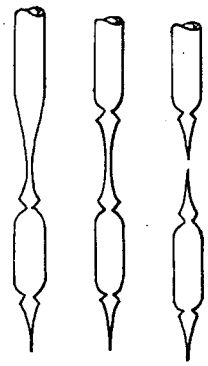
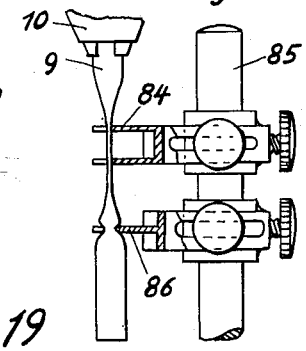
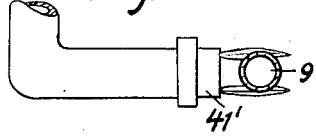
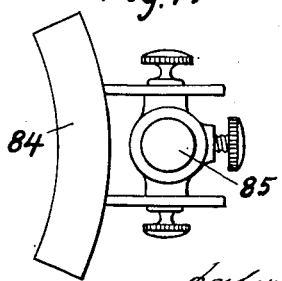
INVENTOR

Patented June 12, 1934

1,962,985

UNITED STATES PATENT OFFICE 1,962,985

MACHINE FOR THE MANUFACTURE OF AMPULLAS AND THE LIKE GLASS BODIES

Jakob Dichter, Berlin, Germany

Application June 22, 1931, Serial No. 546,046
In Germany May 22, 1930

15 Claims. (Cl. 49—7)

The invention refers to a method and machine for the manufacture of ampullas and the like glass bodies, and has for its object the production of ampullas with one or two spear heads in such manner that firstly the bottom is formed, then the spear head drawn out and the constriction made, whereupon the separation from the glass tube is effected by melting, thereby automatically closing the ampulla at the spear head. The raising of the air temperature in the ampulla during the working creates a vacuum therein, whilst simultaneously the ampulla is sterilized and by means of the sealing remains sterilized until the introduction of the medicament. During the working of the process the bottom of the glass tube is always again reformed, owing to the melting of the spear head—there is consequently no loss of glass.

If ampullas with two spear heads are to be formed the remaining spear head is not melted to form a bottom, but remains as a spear head and if necessary can be constricted, whereas the other end can be drawn out in the same manner as already described, constricted and finally separated and closed by melting.

The machine to carry out the present invention is built in such a manner as to subject the glass tube during the transit of a definite path, suitably a circuit, to the influence of several burner flames, as well as to the action of several pulling and relatively stemming movements or the like, so as to obtain the aforementioned effects. The flames therefore and the means employed to produce the movements, i. e. the clamping-chucks holding the glass tube, take part in the progression of the glass tube during its transit, so that the flames, the axial movements, and also the opening and closing positions of the clamping-chucks, are duly regulated in predetermined sequence, both as to time and place.

It is practical to construct the machine in such manner as to carry several tubes simultaneously, during the describing of the spherical path, therefore several sets of clamping-chucks to hold the glass tubes are provided and also of burner flames working in conjunction therewith, whilst the regulators for the burner flames and controlling the clamping-chucks respectively are permanently fixed, so that when the machine is in action, the various clamping-chuck pairs holding the glass tubes, follow one another in sequence, and are subjected to the same operations at the same predetermined parts of the machine.

It is preferable to construct the machine rotating around a vertical axle, the clamping-chucks being adjusted vertically and placed opposite to each other equidistantly around a circle. Each clamping-chuck is provided with the necessary burner flames, i. e. a heating flame for drawing out the spear heads, a flame for forming the constriction of the spear head and fusion of the bottom, the latter being replaced by a separating flame in conjunction with a constriction flame if ampullas with two spear heads are to be produced.

According to the invention, the heating gas is admitted to the burners by pipes that are attached to the controlling mechanism, for regulating the flow of gas in such a manner that they are always acted upon in like manner in the same place. Furthermore the clamping-chucks are furnished with suitable means, such as levers for instance, which cause the clamping-chucks to approach or recede from one another and also to open and shut their jaws. During the circuit the clamping-chucks, and therefore obviously the glass bodies, describe a synchronized rotary movement by means of a cog wheel drive. To determine the distance of each pair of clamping-chucks, a separate sliding rail is provided, on which runs a sliding roll belonging to each lower clamping-chuck, effecting the up and down movement of the lower clamping-chuck, in accordance with the shape of the sliding rail; whereas the upper clamping-chuck is firmly fixed to its holder and therefore only shares the rotary movement around the axis.

Special abutments distributed around the circumference simultaneously open and shut the pairs of clamping-chucks by means of levers and notches.

The drawings illustrate one particular example of such a machine, on which 8 pairs of clamping-chucks in vertical superimposition arranged in a circle, rotate around an axis, and simultaneously execute a turning movement so that at each rotation of the star supporting the clamping-chucks, eight ampullas can be completed.

Fig. 1 shews the salient points of the machine in a vertical section, for simplicity only a single pair of clamping-chucks is shewn. Fig. 2 is a front view of a pair of clamping-chucks working together. Fig. 3 shews the progress of work as the important sequential positions follow one another in rotation, and Fig. 4 is an elevation of the machine. Fig. 5 is an elevation shewing the pivoting arrangement of the constricting burner. Fig. 6 shews a completed ampulla with a flat bottom, and Fig. 7 a completed ampulla with drawn-out spear heads and constrictions at both ends. Figs. 8, 9 and 10 shew details of the gas control in elevation. Fig. 11 shews a two spear ampulla and Figs. 12 and 13 shew the side view and elevation of the abutment of such an ampulla. Figs. 14, 15 and 16 shew the operative steps of ampullas with two constricted spear heads. Figs. 17 and 18 give a side and end view of the constricting burner, and Figs. 19 and 20 an elevation and side view of a centering rail and a rib for adjusting the depth of the constriction.

In the frame 1 (Fig. 1) the rigid axle which runs from top to bottom, is vertically fixed. Around this axle rotate the upper and lower stars 3 and 5 also the middle wheel 4. The star plates 3 and 5 as well as wheel 4, are rigidly connected by upright bolts 6 on each leg. Between the upper and lower stars 3 and 5 two upright rods 7 are firmly fixed for every pair of clamping-chucks (Figs. 1 and 2). The upper clamping-chucks 8, to receive glass tubes 9, are fixed to the rotary frame which includes the upper and lower end spiders 3 and 5, and the wheel or central spider 4. Opposite and beneath clamping-chucks 8, are clamping-chucks 10, vertically slidable on rods 7 by means of sleeve 11. Both chucks, which may be constructed in any known manner, close automatically, for which purpose a closing spring 12 is provided.

The machine is driven as follows:—A gear wheel 15 engaging with wormgear 16, is driven from spindle 13 by means of a chain 14. The wormgear 16 is connected with the hub of the star 5 by means of a collar 17. Therefore the gear wheel 15 rotating, causes the carrying frame of the clamping-chucks, consisting of stars 3 and 5, wheel 4 and the bolt 6, also to rotate.

In addition the clamping-chucks rotate in similar manner around their own axis. For this purpose vertical shaft 20, which engages by means of cogwheel 21 with a freely rotatable toothed gear wheel 22, is rotated by shaft 13, by means of bevel wheels 18 and 19. The toothed gear wheel 22 runs on balls 23 around a cylindrical disc 24 to which a further reference follows later. In each upper and lower leg of the stars 3 and 5 are rotatably movable shafts 25, of which the lower cogwheel 26 meshes with cogwheel 22. Furthermore on every shaft 25 there are two cogwheels 27 and 28 the first of which (27) governs the cogwheel of chuck 8, which it rotates by means of intermediary cogwheel 29, and the second (28) governs cogwheel 32 of the chuck 10 by means of intermediary cogwheel 31. Both chucks having identical teeth are synchronically driven in the same direction. The lower cogwheel 28 is coupled to gear box 34 of the lower chuck 10 by means of a collar 33, and a groove and tongue, and suitably connected to axle 25, so that the lateral displacement of chuck 10 axially imparts the same displacement to the gear drives 28, 31 and 32.

Suitably placed on the inside and opposite each pair of clamping-chucks are the burners 35, which make the spear heads; each connected by gas pipes 36 to a disc 37 revolving with the star frame of the clamping-chuck pairs; corresponding to eight clamping-chuck pairs, and equidistantly distributed around them, eight suitable gas pipes 36, and eight openings for same 38, are provided for in plate 37 which acts as a circular slide. This plate rests on the fixed plate 24 which has a grooved channel 39 extending over part of its circumference only, and is connected with a gas pipe 40. The gas therefore enters the grooved channel 39 by means of the gas pipe 40 and reaches the opening 38 of the circular slide 37 and the piping 36 to the nozzle 35. The gas supply only continues as long as its corresponding opening 38 of the circular slide 37 is opposite to the grooved channel 39. A fixed pilot burner, suitably attached at the circumference of the circular path of the clamping-chuck pairs, causes ignition, and the flame is extinguished directly opening 38 reaches the end of the grooved channel 39.

A special constricting flame 41' is provided at each clamping-chuck pair connected by gas pipe 41 to an opening 42 of the turning slide 43 coupled with the upper star 3 and therefore rotating in unison with the latter. Opposite the openings 42 of the slide, is arranged a groove 45 in the face of the fixed slide 44 fed by gas pipe 46, so that analogous as described to gas flame 35, the supply, the ignition and the extinguishing of the gas are determined by the length and position of groove 45.

The necessary proximity of the constricting flames to the tubes to be softened, i. e. brought close to the axis of every clamping pair, and then made to recede gradually, is effected in the following manner:—The burners 41' are so attached around the pivot 47 on the central wheel 4, as to allow a swinging movement. Lever arm 48 on gas pipe 41 slides on a rigid slide-bar or cam 50 by means of roller 49. In the farthest position from the centre burners 41' swing away from the glass tube, but approach it in the lowest position 51. The lowest position is dimensioned in such manner, that provided it is properly adjusted, the correct constriction of the ampulla must follow (Fig. 5). As shewn in Figs. 17 and 18 the constricting burner 41' has two parallel flames, their position and distance being arranged so as to grip the glass tubes between them at the requisite distance commensurate with the depth of constriction desired.

For melting the bottom a double flame 52 operating from both sides is employed, which is adjustable vertically on both sides of the middle axis of every clamping-chuck pair (vide Figs. 1 and 2). From each pair of burners 52 a pipe 53 leads to opening 54 of the slide 43. On the top of the rigidly fixed face of slide 55, a groove 56 is provided in which runs a gas pipe 57. This groove is of such length and construction, that the gas is admitted to, or shut off from burners 52 at the suitable point of the rotation, so as to perform the sundering of the spear head, the melting of the bottom, or the softening of a lower constriction.

It is to be noted that as illustrated in Fig. 3, steps 7 and 8, the burners 52 are preferably so arranged that the flames issue from the same at an angle acute to the previously formed stem or portion of the ampoule which is reduced in cross section. This arrangement of the burners facilitates the forming of a bottom having the desired characteristics on the next ampoule to be formed. Further, it is to be noted that the flames from burners 52 strike the glass tube at a point where the tube is of substantially greater cross section than the previously formed stem or reduced portion of the tube so that the bottom formed by these flames is of substantially greater cross section than the stem or reduced portion of the already formed ampoule, this bottom being preferably of substantially the same cross section as the original length of tubing.

For the formation of the ampullas, in addition to the action of the various flames, it is also necessary that the separate clamping-chuck pairs should open and close in addition to the axial displacement of the lower clamping-chucks.

Upper clamping-chuck 8 is opened and closed by lifting roller 58, which by means of lever 59 pulls back the jaws of the chuck against the influence of spring 12, thus spreading them. The lifting and subsequent closing, are effected by finger 60, suitably provided on the periphery of the machine, for instance on pillar 61. The opening and closing of upper clamping-chucks 8 only serve to give the glass tube 9 the necessary impetus, each time an ampulla is separated, this impetus being effected by glass tube 9 slipping automatically by gravity, as far as abutment 62, also attached to pillar 61, when the jaws are opened.

Lower clamping-chuck 10 is opened and closed by a two armed lever 63, affixed to collar 34 which by means of a movable finger 64, compressing spring 12, causes the clamping-chucks to open by drawing them back. The position of lever 63 as indicated in Fig. 3, steps 1 and 2, shews the clamping-chucks open, the lower arm of the angle lever 63 resting with one notch 65 on roller 66 and holding the jaws open. If the jaws are to be closed, the lever is swung in the direction of the arrow 68, by means of a rigidly fixed abutment 67 (Fig. 3) at a suitable position on the rail path of the machine, and thus by the action of spring 12 causing the jaws to grasp the lower ends of the glass tubes.

The axial movement necessary thereto, is brought about by a vertically movable rod 69 at the outside end of the angle line of the lower star 5, running by means of sliding roller 70 on sliding rail or cam 71 (Fig. 1) which will be fully referred to here below. This rod acts on the body 34 of the clamping-chuck 10 by means of an adjustable abutment lifting the clamping-chuck, where the sliding rail 71 rises, whereas at the descending path thereof, the clamping-chuck is carried down by gravity.

The sliding rail 71 is vertically adjustable to fit the machine for working ampullas of various lengths. For this purpose the sliding rail 71 is supported by several bolts 73 which pass through the plate 72 of frame 1, are fixed to rigid frame 74, and are vertically adjustable from below by means of screw 75 and hand wheel 76.

The sliding rail 71 moreover is fitted in the places requiring variability with jointed curved links 79, which independently can be set into any required oblique position, so as to fit the sliding rail in accordance with the various functions required.

The operating of the machine, and the steps of the method for producing an ampulla with bottom according to Fig. 6 is to be seen in Fig. 3 which shews in a plane what takes place in the machine in circular form. The steps begin on the right in position 1 travelling to the left in the direction of the arrow, the 8 principal positions being indicated by subdivisions.

On the extreme right in position No. 1 are shewn the pair of clamping-chucks that work together, and the pillars supporting same. No. 1 is the position in which the bottom 77 of the ampulla is already formed by melting on glass tube 9, and the latter slides downwards through momentary opening of clamping jaws 8, until the bottom rests on plate 62, in which position, sliding on plate 62, it is maintained until the closing of the clamping jaws takes place, immediately after the glass tube leaves position 1 and assumes position 2. As already explained the clamping jaws are opened by lifting the sliding roller 58, together with the connecting lever 59, by means of the short finger 60. When the finger 60 slides off, the jaws close under pressure of spring 12 and the glass tube is again gripped. Immediately afterwards upon proceeding from position 1 to position 2, the burner flame 35 for drawing out the spear head, is ignited by a pilot flame not shewn in the drawing, which is provided at a rigid part of the periphery. In the further positions 2–8 and beginning again at 1, Fig. 3 merely indicates the two clamping-chucks of the progressing pairs in conjunction with the burner flames operating at the time and the abutments opening and closing the levers of the lower clamping-chuck. At the foot of the drawing the sliding rail is represented, shewing its upper curves as described, to co-operate with roller 70 and rod 69, and therefore bringing the lower clamping-chuck 10 into the various vertical levels, opposite the upper clamping-chuck 8. During the transition from position 1 to position 2 the roller 70 has already reached the rising part of sliding rail 71 so that the lower clamping-chuck 10 has been gradually raised. During the further progress of the pair of clamping-chucks from position 2 to position 3, burner flame 35 remains alight, and heats the glass for the drawing out of the spear head. In position 3 clamping-chuck 10 gliding forward on the rising portion of sliding rail 71, has reached the highest point, whereupon the jaws of the clamping-chuck close and grip the lower end of the ampulla body to draw out the spear head and holds the ampulla during the work. The jaws of clamping-chucks 10 are closed by the release of pressure spring 12, through the lower lever arm of the angle lever 63 in the direction shewn by arrow 68. For this purpose is provided on a pillar 78, outside the periphery, but within the orbit of the lever arm, an obliquely rising abutment 67, against which the lever arm strikes, and thereby gradually swings round in an upward direction, in which position the clamping-jaws are closed. This position now existing is maintained during the further progress of the operations from position 3 to position 4, i. e. the flame 35 continues to heat the glass tube 9 during the constant rotation of same by the rotating clamping-chucks. The heating continues until position 5 is reached, at which point the burner flame 35 is extinguished. The burner flame is extinguished by the gas being cut off by circular slide 37 and slide 24 acting together with the grooved gas channel 39, which stops at the spot where the corresponding opening 38 has reached position 5 (Fig. 3). In this position a rapid drawing apart of the softened material to form the spear head begins to take place, being effected by the transition from position 5 to position 6, owing to the gliding of roller 70 upon the rapidly following descent of sliding rail 71 in this direction. As soon as position 6 has been reached by the ampulla together with the continuously rotating clamping-chucks 8 and 10, the burner flame 41' swings around to the ampulla body, and the two pointed tongues of flame now begin to heat the glass material at the constricting point i.e. where the cylindrical end of the ampulla is transformed into the spear head. During this operation, on the path from position 6 to position 6a, a further slight drawing apart of the glass material softened at this point takes place owing to a slight downward slope of sliding rail 71, whereupon during the transition to position 7 by gentle rising of the sliding rail, a slight thickening by back pressure or stemming of the slightly heated material takes place during the constriction whilst simultaneously the burner flame 41' is extinguished by the gas being shut off through its turning slides 43 and 44. Simultaneously in this position, the two burner flames 52 for forming ampulla spear heads ignite, and heat the material sufficiently so that on the separating of the ampulla end, the bottom also is formed on the glass tube and remains in the upper clamping jaw. To promote the separation and unimpeded bottom forming clamping-chuck 10 is slightly depressed by a further lowering of sliding rail 71 upon which roller 70 slides. Arrived at this position the ampulla is finished and rolls out of the machine, whereas the glass tube 9 with its bottom already formed for the next ampulla, is allowed to slide down through the opening of the clamping-jaws, for a length, commensurate with the length of the next ampulla. The finished ampullas drop out or are thrown out on the transit from the last position 8 to position 1, that is at position 8a. At this point attached to carrier 80, within the orbit of the lever arm 63 of the lower clamping-chuck 10, there is an abutment 81, against which the upper arm of the angle lever 63 strikes swinging downward in the direction indicated by the arrow, whereby the jaws of the clamping-chucks 10 are opened and the ampulla drops out through the central aperture of same. On the further journey from position 8a to position 1 the upward movement of roller 58 of clamping-chuck 8 on to the finger 60 begins again, whereby the jaws of the clamping-chuck 8 are opened and tube 9 slides downwards till it reaches abutment plate 62. At this point the initial position is reached and the operative steps continue in the manner aforesaid.

The ampulla that drops out is sealed at its upper end, and sterilized internally, a partial vacuum being created.

It being advantageous to maintain a straight and central position before the melting off, a double guiding rib 84 (Figs. 19 and 20) is provided, fixed to pillar 85 on the periphery path. The depth of the constriction is regulated by a similar rib 86 provided on the same pillar.

The working has been described for producing one ampulla, on one pair of clamping-chucks. As eight glass tubes are rotated simultaneously at each complete revolution, the same number of ampullas results.

If ampullas with spear heads at both ends are to be made as shewn in Fig. 7 then plate 62 is arranged as shewn in Figs. 12 and 13 i.e. with a slot, open in the direction of rotation. In this case no bottom is formed on, as is done on the journey from positions 7 to 8; but when the spear head is drawn out to a sufficient length, it is sundered in the middle, so that a spear head also remains at the top, as shewn in Figs. 14 to 16. The lower spear end slips into slot 82, where it is held by the slanting shoulder of the spear head. When the ampulla is finished in the manner afore described, the lower spear can also be constricted towards the end of the process in similar manner to the upper spear head. For this object the flame must be adjusted in an adequate position and the slide roller 70 adapted to the task, which after the preceding description will be readily understood.

I claim:

1. In an automatic machine for manufacturing ampullae from glass tubes in combination, a table, a revolving vertical column; spiders rigidly mounted to said column and revolving with it; rods connecting the upper and the lower of said spiders; vertical bars slideably supported by said spiders; clamping chucks slideably supported by said bars, said chucks being arranged in pairs and adapted to receive said glass tubes; burners between two chucks belonging to one pair adapted to heat and melt the glass tube held by said chucks; and additional burners arranged above said first mentioned burners, said additional burners having two nozzles adapted to produce two oppositely directed flames.

2. In an automatic machine for manufacturing ampullae from glass tubes in combination, a table, a revolving vertical column; three spiders rigidly mounted to said column and revolving with it; rods connecting the upper and the lower of said spiders; vertical bars slideably supported by said spiders; clamping chucks slideably supported by said bars, said chucks being arranged in pairs and adapted to receive said glass tubes; burners between two chucks belonging to one pair adapted to heat and melt the glass tube held by said chucks; said burners being pivotally mounted on that spider which is positioned between the upper and lower spiders, a cam mechanism for imparting oscillating movement to said burners, and additional burners arranged above said first mentioned burners, said additional burners having two nozzles adapted to produce two oppositely directed flames.

3. In an automatic machine for manufacturing ampullae from glass tubes in combination, a table; a revolving vertical column; spiders rigidly mounted to said column and revolving with it; rods connecting the upper and the lower of said spiders; vertical bars slideably supported by said spiders; clamping chucks slideably supported by said bars, said chucks being arranged in pairs and adapted to receive said glass tubes; burners between two chucks belonging to one pair adapted to heat and melt the glass tubes held by said chucks; other burners arranged below said first mentioned burners, said first-mentioned and said other burners having nozzles adapted to produce two parallel flames; fuel supply lines connected to said other burners; fuel control means interposed into said fuel supply lines, said control means consisting substantially of a rotating disc rigidly mounted on to said rotating column and a stationary disc cooperating with said rotating disc, one disc being provided with openings, the supply of fuel to said other burners depending on the relative position of said rotating and said stationary discs to one another; additional double burners adapted to direct two flames in opposite directions to one another, whereby the glass tube is substantially at the point of impingement of said two flames, said additional double burners being adapted to melt the bottom of said ampullas; fuel supply lines connected to said additional double burners; fuel control means interposed into said fuel supply lines, said control means consisting of that same rotating and stationary disc controlling the fuel supply to said other burners and having another set of openings adapted to control the fuel supply to said additional double burners.

4. In a machine of the class described, a pair of gripping devices for gripping a length of tubing, means for heating a portion of the length of tubing between the said gripping devices while the length of tubing is held by the said gripping devices, means providing for relative movement of said gripping devices away from each other to reduce the cross sectional area of the heated portion of the length of tubing, and additional means to heat the tubing between the gripping devices while the tubing is gripped thereby and at a point where the tubing is of substantially greater cross sectional area than the reduced portion thereof to seal the reduced portion of the length of tubing and to form a bottom on the adjacent end of the length of tubing of substantially greater cross section than the reduced portion of the length of tubing.

5. In a machine of the class described, a pair of gripping devices for engaging a length of tubing, means for heating a portion of the length of tubing between the said gripping devices and while the length of tubing is held by the said gripping devices, means providing for relative movement of said gripping devices away from each other to reduce the cross sectional area of the heated portion of the length of tubing, and means for directing a flame against the length of tubing at an angle acute to the reduced portion of the length of tubing to heat the tubing between the portion thereof which is reduced in cross section and the remainder of the length of tubing and at a point where the tubing is of substantially greater cross section than the reduced portion of the length of tubing to seal the reduced portion of the length of tubing and to form a bottom on the adjacent end of the length of tubing of substantially greater cross section than the reduced portion of the length of tubing.

6. In a machine of the class described, means for holding a length of tubing, means to release said holding means to provide for movement of the length of tubing relative thereto to expose a portion of the length of tubing, a second holding means for gripping the exposed portion of the length of tubing, means to heat the exposed portion of the length of tubing between the two holding means while the length of tubing is held by the said holding means, means providing for relative movement of said holding means away from each other to draw the heated portion of the length of tubing to reduce the cross sectional area of the length of tubing, and additional means to heat the tubing between the gripping devices while the tubing is gripped thereby and at a point where the tubing is of substantially greater cross sectional area than the reduced portion thereof, to seal the reduced portion of the length of tubing and to form a bottom on the adjacent end of the length of tubing of substantially greater cross section than the reduced portion of the length of tubing.

7. In a machine of the class described, means for holding a length of tubing, means to release said holding means to provide for movement of the length of tubing relative thereto to exposed portion of the length of tubing, a second holding means for gripping the exposed portion of the length of tubing, means to heat the exposed portion of the length of tubing between the two holding means while the length of tubing is held by the said holding means, means providing for relative movement of said holding means away from each other to draw the heated portion of the length of tubing to reduce the cross sectional area of the length of tubing, and means for directing a flame against said length of tubing and at an angle acute to the reduced portion thereof, to heat the tubing between the portion thereof which is reduced in cross section and the remainder of the length of tubing and at a point where the tubing is of substantially greater cross section than the reduced portion thereof to seal the reduced portion of the length of tubing and to form a bottom on the adjacent end of the length of tubing of substantially greater cross section than the reduced portion of the length of tubing.

8. In a machine of the class described, a pair of gripping devices for engaging a length of tubing, means for heating a portion of the length of tubing between the said gripping devices while the length of tubing is held by the gripping devices, means providing for relative movement of said gripping devices away from each other to reduce the cross sectional area of the heated portion of the length of tubing, and means providing for relative movement of said gripping devices toward each other to slightly round the length of tubing adjacent the portion thereof which is reduced in cross sectional area.

9. In a machine of the class described, a pair of gripping devices for gripping a length of tubing, means for heating a portion of the length of tubing between the said gripping devices while the length of tubing is held by the gripping devices, means providing for relative movement of said gripping devices away from each other to reduce the cross sectional area of the heated portion of the length of tubing, means to heat a second portion of the length of tubing between the said gripping devices while the length of tubing is held by the gripping devices and means providing for relative movement of said gripping members to form a constriction in the length of tubing at said last mentioned heated portion.

10. In a machine of the class described, a pair of aligned gripping devices for engaging a length of tubing, means for heating a portion of the length of tubing between the said gripping devices while the length of tubing is held by the gripping devices, means providing for relative movement of said gripping devices away from each other to reduce the cross sectional area of the heated portion of the length of tubing, means to heat a second portion of the length of tubing between the said gripping devices while the length of tubing is held by the said gripping devices, means for relatively moving said gripping devices to form a constriction at said second mentioned heated portion, and means to heat the tubing between the portion thereof which is reduced in cross section and the remainder of the length of tubing and at a point where the tubing is of substantially greater cross sectional area than the reduced portion thereof to seal the reduced portion of the length of tubing and to form a bottom on the adjacent end of the length of tubing of substantially greater cross section than the reduced portion of the length of tubing.

11. In a machine of the class described, a pair of gripping devices for engaging a length of tubing, means for heating a portion of the length of tubing between the said gripping devices while the length of tubing is held by the said gripping devices, means providing for relative movement of said gripping devices away from each other to reduce the cross sectional area of the heated portion of the length of tubing, and means for directing a flame against the length of tubing at an angle acute to the reduced portion of the length of tubing, the flame from said means being adapted to seal the reduced portion of the length of tubing and to form a bottom on the adjacent end of the length of tubing of substantially greater cross section than the reduced portion of the length of tubing.

12. In a machine of the class described, means to heat a portion of a length of tubing intermediate the ends thereof, gripping devices for gripping the length of tubing on opposite sides of the heated portion, means for relatively moving the gripping devices away from each other to reduce the cross sectional area of the heated portion of the length of tubing, and additional means for directing a flame against the length of tubing at an angle acute to the reduced portion thereof and at a point where the tubing is of substantially greater cross sectional area than the reduced portion thereof to seal the reduced portion of the length of tubing and to form a bottom on the adjacent end of the length of tubing of substantially greater cross sectional area than the reduced portion of the length of tubing.

13. In a machine of the class described, means for heating a portion of a length of tubing intermediate the ends thereof, gripping devices for gripping the length of tubing on opposite sides of the heated portion thereof, and means providing for relative movement of the gripping devices away from each other and then toward each other to first reduce the cross sectional area of the heated portion of the length of tubing and to then slightly round the length of tubing adjacent the portion thereof which is reduced in cross sectional area.

14. In a machine of the class described, means for heating a portion of a length of tubing intermediate the ends thereof, gripping devices for gripping the length of tubing on opposite sides of the heated portion thereof, means providing for relative movement of the gripping devices away from each other to reduce the cross sectional area of the heated portion of the length of tubing, means to heat a second portion of the length of tubing between the gripping devices while the length of tubing is held by the gripping devices, and means providing for relative movement of said gripping devices to form a constriction in the length of tubing at the last mentioned heated portion.

15. In a machine of the class described, means for heating a portion of a length of tubing intermediate the ends thereof, gripping devices for gripping the length of tubing on opposite sides of the heated portion thereof, means for rotating said gripping devices to thus rotate the length of tubing held thereby, means providing for relative movement of the gripping devices away from each other to reduce the cross sectional area of the heated portion of the length of tubing, additional means to heat a second portion of the length of tubing between the gripping devices while the length of tubing is held by the gripping devices, means providing for relative movement of said gripping devices away from each other to form a constriction in the length of tubing at the last mentioned heated portion, means providing for relative movement of said gripping devices toward each other to slightly round the length of tubing adjacent the said constriction, and additional means to direct a flame against the length of tubing at an angle acute to the first mentioned reduced portion thereof and at a point where the tubing is of substantially greater cross sectional area than the first mentioned reduced portion thereof to seal the first mentioned reduced portion of the length of tubing and to form a bottom on the adjacent end of the length of tubing of substantially greater cross sectional area than the first mentioned reduced portion of the length of tubing.

JAKOB DICHTER.